United States Patent [19]

Barrett et al.

[11] Patent Number: 5,085,131
[45] Date of Patent: Feb. 4, 1992

[54] HYDRAULIC CYLINDER FOR AUTOMOTIVE STEERING SYSTEMS AND THE LIKE

[75] Inventors: Brian F. Barrett, Garden City; Frank H. Firek, Northville, both of Mich.

[73] Assignee: Prime Tube, Inc., Plymouth, Mich.

[21] Appl. No.: 608,577

[22] Filed: Oct. 2, 1990

[51] Int. Cl.⁵ ............................ F01B 11/02; B23P 15/06
[52] U.S. Cl. ................................. 92/169.1; 92/261; 92/128; 29/888.06; 72/84; 228/60
[58] Field of Search ................ 92/59, 128, 169.1; 29/888.06, 888.061; 72/84; 228/60

[56] References Cited

U.S. PATENT DOCUMENTS

| | | |
|---|---|---|
| 537,014 | 4/1895 | Burton . |
| 1,280,823 | 10/1918 | Oster . |
| 2,406,059 | 8/1946 | Burch . |
| 2,408,596 | 10/1946 | Bednar . |
| 2,524,420 | 10/1950 | Blampin . |
| 2,595,319 | 5/1952 | Woldman . |
| 2,724,368 | 11/1955 | Miller ................................. 92/128 |
| 2,737,067 | 3/1956 | White ................................. 228/60 |
| 3,015,315 | 1/1962 | Strimel ............................. 92/169.1 |
| 3,046,949 | 7/1962 | Reynolds et al. .................. 92/169.1 |
| 3,793,863 | 2/1974 | Groppini ............................ 228/60 |
| 3,886,849 | 6/1975 | Roberts et al. ................... 92/169.1 |
| 3,956,914 | 5/1976 | Prochaska . |
| 4,628,704 | 12/1986 | Kilby . |

FOREIGN PATENT DOCUMENTS

| | | |
|---|---|---|
| 534052 | 10/1955 | Italy ................................... 92/169.1 |
| 0125220 | 7/1984 | Japan ................................. 228/60 |
| 1355325 | 11/1987 | U.S.S.R. ............................... 72/84 |

Primary Examiner—Edward K. Look
Assistant Examiner—Thomas Denion
Attorney, Agent, or Firm—Brooks & Kushman

[57] ABSTRACT

An automotive steering system hydraulic cylinder and method for making the cylinder are disclosed. The cylinder is attached to a rack and pinion gear assembly housing so that a piston from the assembly creates a variable displacement chamber within the cylinder. The cylinder features a smooth interior surface to provide a sealing surface with the piston and an end that has been closed by spin-forming. The method provides a means of easily fabricating such a cylinder.

11 Claims, 3 Drawing Sheets

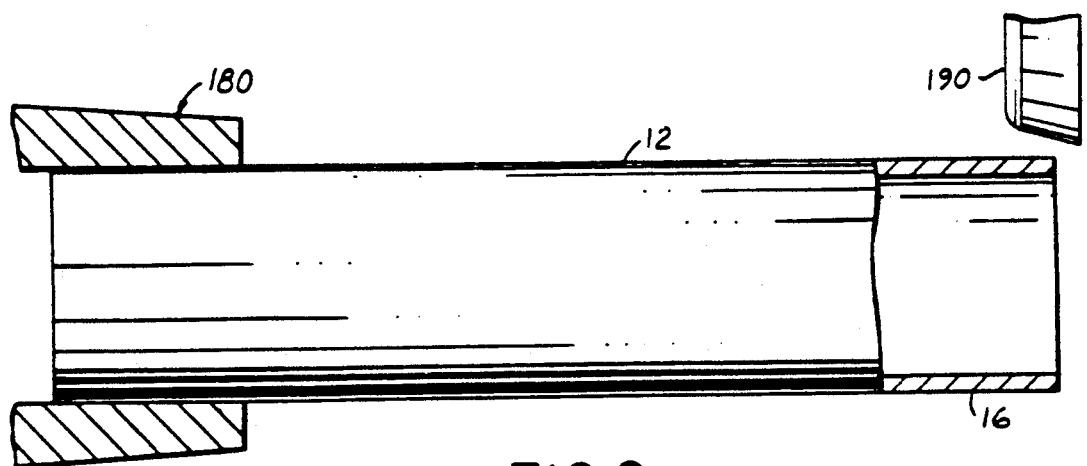
FIG.8
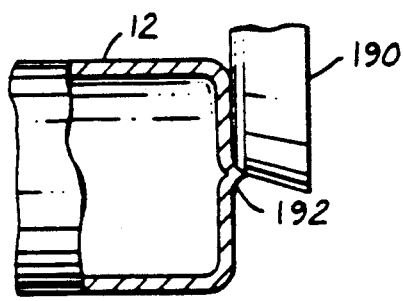
FIG.9
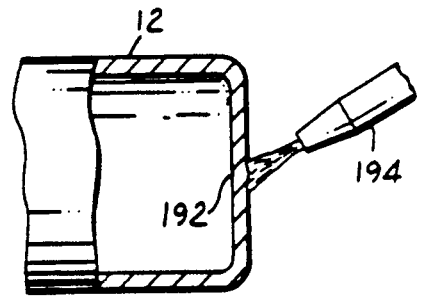
FIG.10
FIG.11
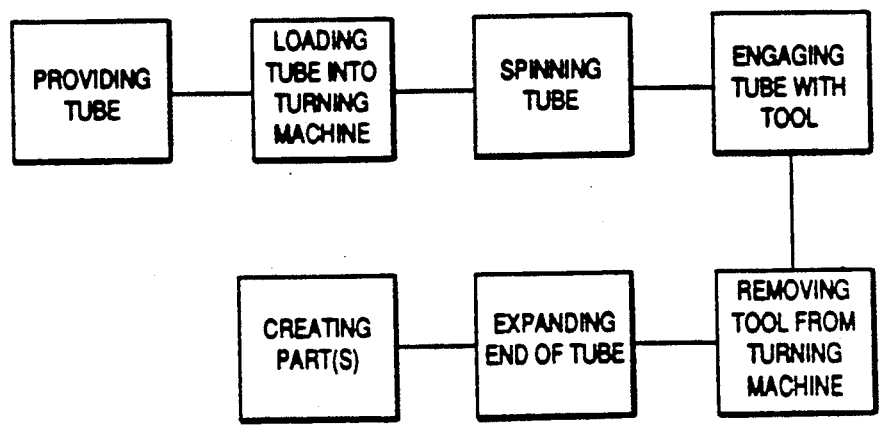

HYDRAULIC CYLINDER FOR AUTOMOTIVE STEERING SYSTEMS AND THE LIKE

TECHNICAL FIELD

This invention relates to automotive steering system hydraulic cylinders and the like and methods for fabricating such cylinders.

BACKGROUND ART

In hydraulic steering systems used for automobiles and light duty trucks, a cylinder is used in cooperation with a piston to control the steering fluid. Because of the high pressures that sometimes occur to the steering system, a reliable seal is needed between the cylinder and the piston resulting in very close tolerances on the interior of the cylinder where the piston travels. One end of the tube has traditionally been closed by welding a cap into the end.

While this prior design has been used successfully, it has several disadvantages, particularly in the fabrication process. During the fabrication process, the prior method of fabricating the cylinder is relatively labor intensive in that it requires the positioning of the separate end cap piece within the high tolerance cylinder and holding it in position during welding. In addition, by requiring the second piece, i.e., the end cap to be joined to the cylinder during fabrication, it increases the likelihood of contamination being carried by the end cap into the cylinder. This is particularly of concern in that if any metal cylinders or other contamination marred the interior central portion of the cylinder where the piston is to travel, the seal between the piston and the sides of the cylinder may not sufficiently exist to allow for adequate operation.

Also, since the joining of the cap to the cylinder requires a complete 360° weld, the welding process must be very precise and despite this, testing often indicates that failure under high pressure most often occurs in this area.

SUMMARY OF THE INVENTION

An object of the present invention is to provide an automotive hydraulic cylinder which may be easily fabricated while maintaining the high tolerances necessary for its use.

It is an object of the present invention to provide an automotive steering hydraulic cylinder where the end of the cylinder is as strong as the sides of the cylinder.

It is a further object of the invention to provide a method of fabricating an automotive steering hydraulic cylinder that can be fabricated with a reduced likelihood of contamination entering into the interior of the cylinder.

An advantage of the invention is that it provides a strong cylinder with a closed end that maintains the tolerances of the prior art on its interior surfaces without the steps required by the prior art.

Accordingly, the automotive power steering cylinder of the current invention is designed for attachment to a rack and pinion gear assembly housing having a piston which will shift axially within the interior of the tube in a central region of the tube. The cylinder includes one end which is suitable for receiving the piston therethrough and which is also provided with means for attachment to the housing. The other end is closed utilizing a spin forming process so as to create an integral pressure tight end. The closed end, the piston within the central region, and the sides of the tube between the closed end and piston define a variable displacement cavity. Means are provided for connecting the variable displacement cavity to a source of fluid. Also provided are means for connecting a second source of fluid to a second variable displacement cavity defined by the end being attached to the housing, the sides of the tube and the piston.

The invention also provides a method for forming a cylinder which includes the steps of providing a thin-walled, open-ended tube having an interior diameter tolerance not greater than 1% of the inner diameter for an extended central region along which the piston is to move, holding the first end of the tube in a turning machine and spinning the tube along its central axis. The method also includes the steps of heating the second end of the tube to a welding temperature and forming the heated end into a seamless closed end by engaging the end by a tool so as to force the end radially inwardly while the tube is spun. Further, the invention provides for a step creating a port for communicating the fluid between the interior of the tube in a region of the tube defined by the closed end, sides of the tube and the extended central region closest to the closed end.

Other objects, features and advantages of the invention will become readily apparent from the following description and the accompanying drawings.

BRIEF DESCRIPTION OF THE DRAWINGS

FIG. 8 is a top view of a tube used in a second embodiment of the present invention prior to its end being closed;

FIG. 9 is a partial top view of the tube of FIG. 8 after its end has been closed through spin forming;

FIGURE 10 is a partial top view of an after forming operation during the embodiment of FIG. 8; and FIGURE 11 is a flow diagram of fabrication steps illustrating the second embodiment of the present invention.

BEST MODE FOR CARRYING OUT THE INVENTION

Figure 1:
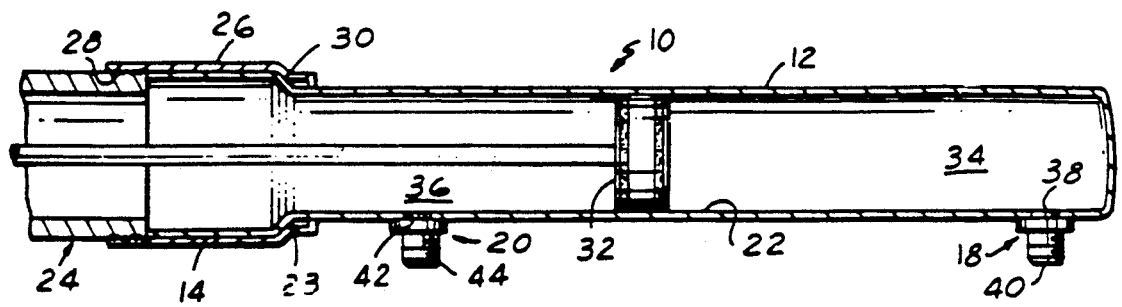
FIG. 1 is a cross-sectional view illustrating the automotive steering hydraulic cylinder of the present invention.

The hydraulic cylinder 10 of the invention is designed particularly with respect to automotive steering systems used in automobiles and light trucks. It features an elongated cylindrical tube 12 as shown in FIG. 1. One end of the tube 14 has an enlarged cross-section sectional area. The second end 16 is closed. A pair of ports 18 and 20 are joined to the side of the tube With a central region 22 between the ports.

The expanded end may have a positioning notch (not shown) to align the cylinder with the housing 24 of a rack and pinion gear assembly. The cylinder includes a collar 26. The collar overlays the expanded end 14 with its normal inner diameters slightly larger than the outer diameter of expanded end 14 so that the collar may be freely rotated around the expanded end. One end 28 of the collar is threaded so it may be screwed onto the housing. On the other end 30 of the collar is a reduced diameter 30 of the collar which acts to move against shoulder 23 on tube 12 to pull the cylinder against housing 24 as the collar is threaded onto housing 24.

Closed end 16 provides an integral pressure tight end with respect to the side walls of tube 12. This closed end is created by spin forming as will be more fully described below. The interior of the tube is provided with a central portion 22 which has a highly smooth surface so to cooperate with piston 32 of housing 24. To prevent hydraulic fluid leaking past the piston, the inner diameter tolerance along the travel of the piston in the central portion of the tube should be no greater than 1% of said inner diameter and preferably less than that. For example, not greater than 0.2 mm where the inner diameter of the central portion where it has an inner diameter of approximately 33 mm. In the preferred embodiment, it is assumed that the tube is made of SAE 1018 through SAE 1026 steels.

Piston 32, closed end 16 and the sides of tube 12 define a variable displacement cavity 34. The displacement of this cavity will vary as the piston travels along the central portion of the tube. A second variable displacement cavity 36 is formed by piston 32, the expanded end 14 and the sides of the tube between the piston and the expanded end. Normally, a seal (not shown) will be positioned adjacent to the expanded end 14 either in the cylinder or housing to prevent fluid from the second displacement cavity from entering into the housing.

Hydraulic fluid is allowed to move into and out of the first variable displacement cavity 34 through a hole 38 through the side wall of the tube which constitutes part of port 18. Port 18 also includes means 40 to allow the cylinder to be connected to a source of hydraulic fluid. Similarly, fluid is allowed to move into and out of variable displacement cavity 36 by means of hole 42 which is part of port 20. Also part of port 20 are means 44 for connecting displacement cavity 36 to a source of hydraulic fluid. Means 40 and 44 normally consist of nipples welded to the sides of tube 12 to which a flexible tube may be joined.

Figure 2:
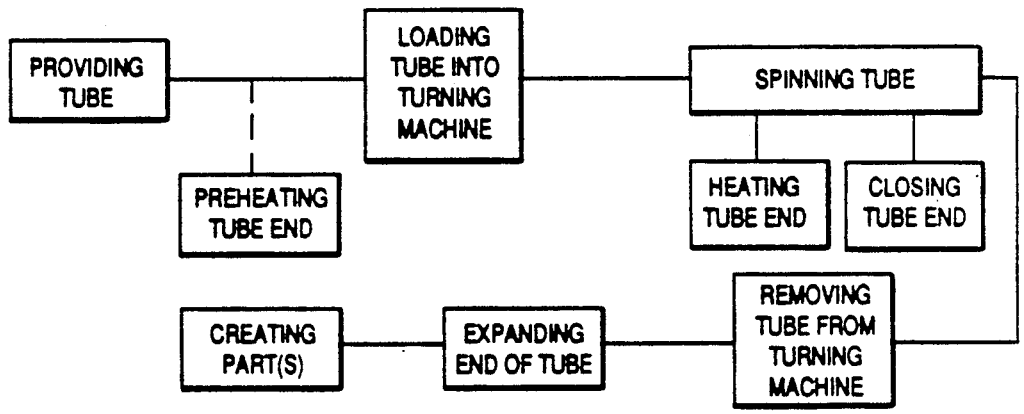
FIG. 2 is a flow diagram of fabrication steps illustrating one embodiment of the present invention.
Figure 3:
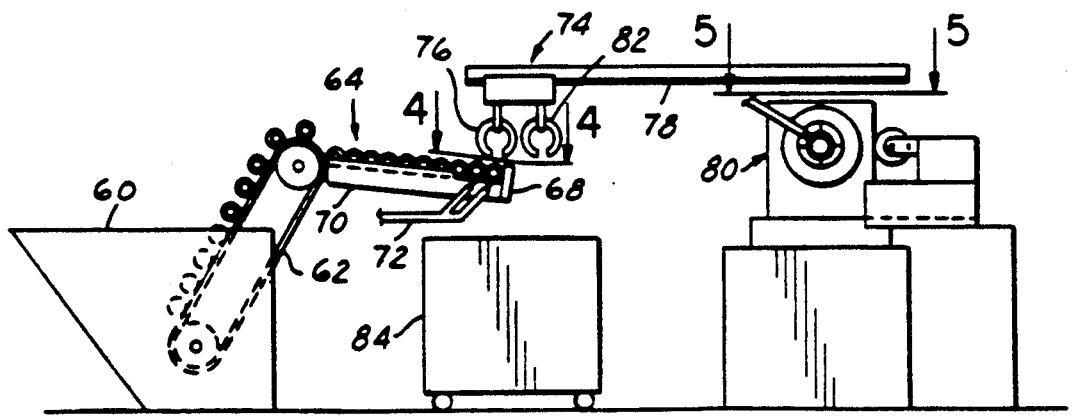
FIG. 3 is an elevated side view of equipment used in the embodiment of the method of the present invention of FIG. 2.
Figure 4:
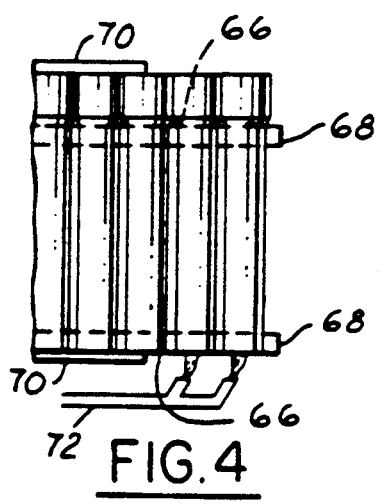
FIG. 4 is a partial top view taken along line 4—4 showing a portion of the equipment of FIG. 3.

Steps of one embodiment used in fabricating a cylinder of the present invention are set forth in the block diagram of FIG. 2. In the first embodiment, a supply of thin-walled, open-ended tubes, preferably of SAE 1018 through 1026 steels, preferably are kept readily on hand such as in storage bin 60. These tubes are then moved by conveyor means 62 to a holding area 64. As shown in FIGS. 3 and 4, the holding area is slightly inclined downward so as to ensure the tubes roll down to the end of the holding area on rails 66 which support the tubes while they await further processing. Attached to the end of the rails 66 are stops 68 which define the end of the holding area. Side rails 70 extend along a substantial portion of rail 66 to align the tubes as they roll down the incline. Side rails 70, however, do not extend down to the end of the holding area, but rather, allow at least one end of the last two or three tubes to be exposed.

A source of heat 72 such as torches shown in FIG. 4 or an electrical induction heat are applied to the end of the tube, which will eventually be closed, to preheat the tubes to a temperature between approximately 150°–500°. After the end has been preheated, overhead conveyor means 74 will grasp the preheated tube in one of its depending robot arms 76 and then move laterally along rail 78. The system shown in FIG. 3 is designed to allow one tube to be positioned in the turning tool 80 while robot arm 76 is moving a second tube into position to be worked. Any tube that has completed the closing operation on turning tool 80 is removed by a second robot arm 82 on overhead conveyor 74 and replaced by the tube in robot arm 76. The closed tube in robot arm 82 is then moved along rail 78 and deposited in a suitable area such as cart 84 for movement to areas of subsequent operation.

Figure 5:
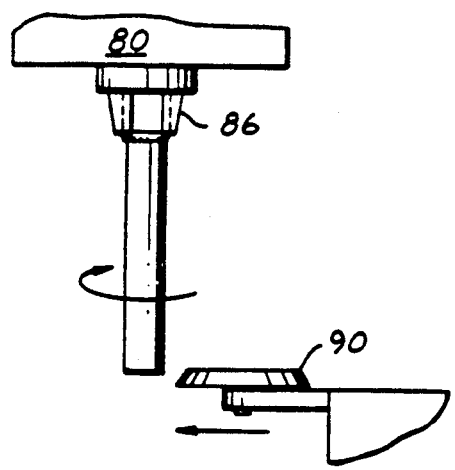
FIG. 5 is a partial top view taken along line 5—5 showing a portion of the equipment shown in FIG. 3.
Figure 6:
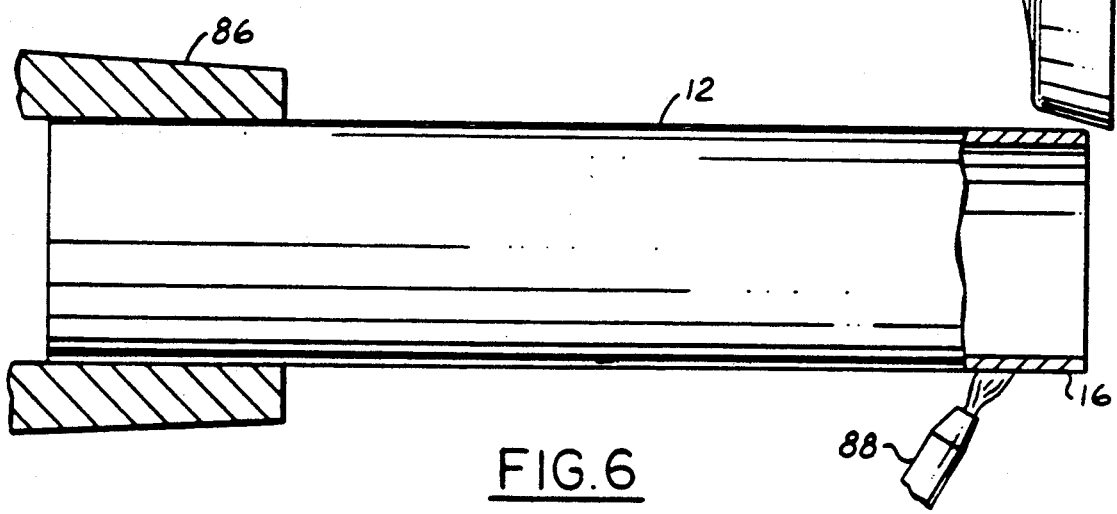
FIG. 6 is a top view of a tube used in the embodiment the present invention prior to its end being closed of FIG. 2.
Figure 7:
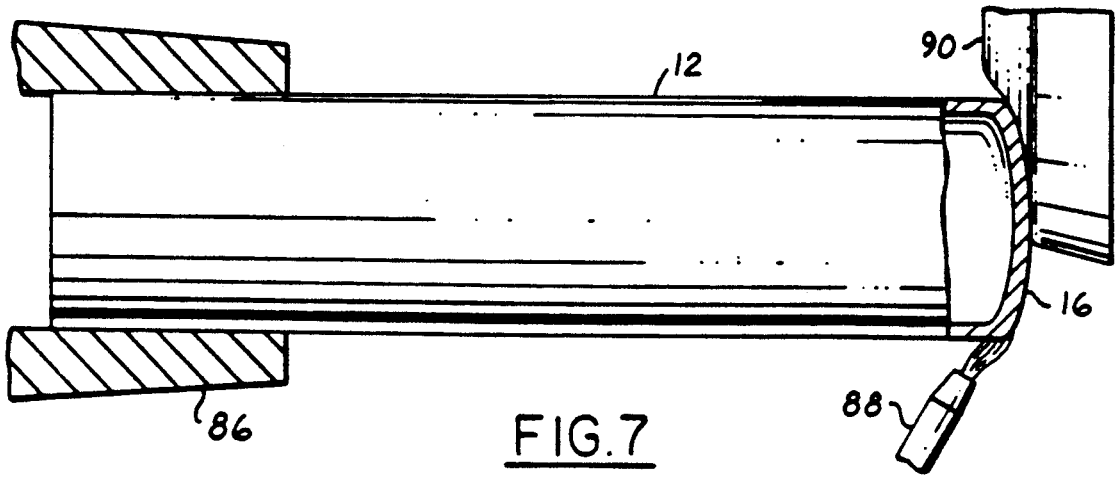
FIG. 7 is a top view of the tube of FIG. 6 after its end has been closed through hot spin forming.

Returning to turning tool 80, a tube that has been preheated is positioned a collet 86 and the collet is tightened to hold the tube in place as shown in FIG. 5. The tube is then spun about its axis. A second heating means 88 shown in the form of another torch is applied to the end 16 of the tube to be closed. As the tube is spun, the temperature of end 16 is raised to a welding temperature of approximately 800° to 1500° F. The flame is initially primarily directed to an area approximately 2.5 centimeters from the end so that this area glows red while the outer end is merely orange. The flame may then be turned off but while the tube is still hot, a forming tool 90 is advanced radially against the tube wall causing the end of the tube to move inward. The tool is continued to be moved toward and past the axial center line of the spinning tube so that when the tool is fully advanced, the end of the tube is completely closed and welded together. The tool is then retracted and the tube may be removed for further operations.

Although the tool 90 may be no more than an arbor movable radially, preferably, it consists of a stationary circular arbor of high speed tool steel or other suitable wear resistant material such as ceramic or the like.

After the tube has been removed, the open end is then expanded at a forming station (now shown) using and expandable I.D. mandrel. After the area through which the piston is to move has been determined, holes 38, 42 may be added as may be hydraulic fuel connection means 40, 44 on each side of the area of travel to provide for ports 18, 20.

Although it is preferable that the end of the tube be closed by heating the end of the tube by an external source such as flame 88, it is recognized that it is possible to have sufficient heat generated by friction between a suitable tool and the spinning tube so as to close the tube. This method is shown by FIGS. 8–11.

Steps of this alternative embodiment used in fabricating a cylinder of the present invention are set forth in the block diagram of FIG. 11. In this embodiment, the pre-turning steps are not shown but are similar to the first embodiment in that, a supply of thin walled, open-ended tubes are preferably kept on hand and moved by means such as those discussed in the first embodiment into position in the turning machine 190. The pre-turning steps differ, however, in that there is no preheating of the tubes. Once the tube is positioned in collet 186 and the collet tightened, the tube wall is spun about its axis. No external source of heat is applied. Rather, a forming tool 190 is advanced radially against the tube wall. In this particular embodiment, it is preferred that the tool 90 is a stationary arbor formed of high speed tool steel. The frictional forces between the tool and the turning tube heat the tube. As friction increases, the temperature of the tube will rapidly increase to or near a welding temperature so that the metal of the tube is deformable by the tool. As the tool is advanced toward and past the axial center line of the spinning tube, the end of tube will close and be welded together. To ensure a complete seal, the center spot 192 of the closed end may then be welded shut by a subsequent welding operation by welder 194. The tube is then removed and the open end expanded and suitable ports made in the tube as in the first embodiment.

Once the tube has been closed, it should be suitable to withstand internal fluid pressures up to 6,000 psig. The tube end should be as strong as the side walls to decrease the chances of failure.

While the best mode for carrying out the invention has been described in detail, those familiar with the art to which this invention relates will recognize various alternative designs and embodiments for practicing the invention as disclosed by the following claims.

What is claimed is:

1. A power steering cylinder for attachment to a housing to shift a piston relative thereto, said cylinder comprising:
    an elongated cylindrical tube having first and second ends and a central region therebetween;
    said first end being suitable for receiving the piston therethrough and provided with means for attachment to the housing;
    said second end being formed closed utilizing a spin forming process to create an integral pressure tight end;
    said central region having a smooth uniform circular cross section inner diameter having an inner diameter tolerance no greater than 1% of said inner diameter for sealingly cooperating with said piston as the piston shifts axially within the tube central region between an operably fully extended position and an operably fully retracted position to define a variable displacement cavity bounded by the sides of the tube, said second end and the piston; and
    means for connecting the variable displacement cavity to a source of fluid.

2. The power steering cylinder of claim 1 further comprising means for connecting a second source of fluid to a second variable displacement cavity defined by said first end, the sides of the tube and the piston.

3. The power steering cylinder of claim 1 wherein said second end remains integral and pressure tight when the variable displacement cavity is pressured to 6,000 psig.

4. The power steering cylinder of claim 1 wherein said second end is formed through a hot spin-forming process.

5. A power steering cylinder for attachment to a housing to shift a piston relative thereto, said cylinder comprising:
    an elongated cylindrical tube having first and second ends and a central region therebetween;
    said first end being suitable for receiving the piston therethrough and provided with means for attachment to the housing;
    said second end being formed closed utilizing a spin forming process to create an integral pressure tight end;
    said central region having a smooth uniform circular cross section inner diameter having an inner diameter tolerance no greater than 0.2 millimeters for sealingly cooperating with said piston as the piston shifts axially within the tube central region between an operably fully extended position and an operably fully retracted position to define a variable displacement cavity bounded by the sides of the tube, said second end and piston; and
    means for connecting the variable displacement cavity to a source of fluid.

6. The power steering cylinder of claim 5 further comprising means for connecting a second source of fluid to a second variable displacement cavity defined by said first end, the sides of the tube and the piston.

7. The power steering cylinder of claim 5 wherein said second end remains integral and pressure tight when the variable displacement cavity is pressured to 6,000 psig.

8. The power steering cylinder of claim 5 wherein said second end is formed through a hot spin-forming process.

9. A power steering cylinder for attachment to a housing to shift a piston relative thereto, said cylinder comprising:
    an elongated cylindrical tube having first and second ends and a central region therebetween;
    said first end being suitable for receiving the piston therethrough and provided with means for attachment to the housing;
    said second end being formed closed utilizing a hot spin forming process to create an integral pressure tight end;
    said central region having a smooth uniform circular cross section inner diameter having an inner diameter tolerance no greater than 0.2 millimeters for sealingly cooperating with said piston as the piston shifts axially within the tube central region between an operably fully extended position and an operably fully retracted position to define a variable displacement cavity bounded by the sides of the tube, said second end and piston; and
    means for connecting the variable displacement cavity to a source of fluid.

10. The power steering cylinder of claim 9 wherein said means for connecting the variable displacement cavity to a source of fluid further comprises a port formed in the elongated cylindrical tube in communication with the variable displacement cavity and a nipple welded to the tube and fluid tank in communication with said port.

11. The power steering cylinder of claim 9 wherein said elongated cylindrical tube is formed of steel falling within the range of SAE 1018 to 1026.

* * * * *

UNITED STATES PATENT AND TRADEMARK OFFICE
CERTIFICATE OF CORRECTION

PATENT NO. : 5,085,131

DATED : February 4, 1992

INVENTOR(S) : Brian F. Barrett et al

It is certified that error appears in the above-identified patent and that said Letters Patent is hereby corrected as shown below:

```
Column 2, Line 67
"With" should be --with--;

Column 6, Line 32, Claim 9 after "cylindrical" and before "tube" insert --
steel--;

Column 6, Line 42, Claim 9 delete "0.2 millimeters" and insert --1% of
said inner diameter--;
```

Signed and Sealed this

Twenty-second Day of June, 1993

Attest:

MICHAEL K. KIRK

Attesting Officer

Acting Commissioner of Patents and Trademarks